United States Patent
Dharwada et al.

(10) Patent No.: US 9,471,202 B2
(45) Date of Patent: Oct. 18, 2016

(54) BUILDING CONTROL SYSTEM USER INTERFACE WITH PINNED DISPLAY FEATURE

(75) Inventors: Pallavi Dharwada, Minneapolis, MN (US); SankaTandav Krishna, Atlanta, GA (US)

(73) Assignee: Honeywell International Inc., Morris Plains, NJ (US)

( * ) Notice: Subject to any disclaimer, the term of this patent is extended or adjusted under 35 U.S.C. 154(b) by 1396 days.

(21) Appl. No.: 12/276,285

(22) Filed: Nov. 21, 2008

(65) Prior Publication Data
US 2010/0131653 A1    May 27, 2010

(51) Int. Cl.
G06F 3/048    (2013.01)
G06F 3/0483    (2013.01)

(52) U.S. Cl.
CPC .................................. G06F 3/0483 (2013.01)

(58) Field of Classification Search
CPC ............. G06F 3/0483; G06F 3/0481; G05B 2219/25011; G05B 2219/31146; G05B 2219/2614
USPC .................................................. 715/771, 847
See application file for complete search history.

(56) References Cited

U.S. PATENT DOCUMENTS

| | | |
|---|---|---|
| 4,375,637 A | 3/1983 | Desjardins |
| 4,816,208 A | 3/1989 | Woods et al. |
| 5,042,265 A | 8/1991 | Baldwin et al. |
| 5,161,387 A | 11/1992 | Metcalfe et al. |
| 5,297,252 A * | 3/1994 | Becker ................... G08B 25/14 340/506 |
| 5,385,297 A | 1/1995 | Rein et al. |
| 5,390,206 A | 2/1995 | Rein et al. |
| 5,768,119 A | 6/1998 | Havekost et al. |
| 5,929,761 A | 7/1999 | Van der Laan et al. |
| 5,946,303 A | 8/1999 | Watson et al. |
| 5,955,946 A | 9/1999 | Beheshti et al. |
| 6,124,790 A | 9/2000 | Golov et al. |
| 6,157,943 A * | 12/2000 | Meyer ..................... H04L 29/06 709/203 |
| 6,178,362 B1 | 1/2001 | Woolard et al. |
| 6,185,483 B1 | 2/2001 | Drees |
| 6,223,544 B1 | 5/2001 | Seem |
| 6,295,527 B1 | 9/2001 | McCormack et al. |
| 6,314,328 B1 | 11/2001 | Powell |

(Continued)

FOREIGN PATENT DOCUMENTS

| | | |
|---|---|---|
| WO | WO 01/97146 | 12/2001 |
| WO | WO 02/052432 | 7/2002 |

(Continued)

OTHER PUBLICATIONS

U.S. Appl. No. 12/643,865, filed Dec. 21, 2009.

(Continued)

*Primary Examiner* — Dino Kujundzic
(74) *Attorney, Agent, or Firm* — Seager, Tufte & Wickhem, LLP (57) ABSTRACT

Building control systems that include a user interface that is configured to help manage relatively large amounts of building control data in an efficient and intuitive manner. In some cases, subsets of building control information can be associated with display elements such as windows or tabs, which can then be pinned to provide a convenient way to selectively display only certain building control information. In some cases, a pinned display element may display one or more building control parameters, which in some cases, can be user selectable and/or updated over time.

20 Claims, 12 Drawing Sheets

(56) References Cited

U.S. PATENT DOCUMENTS

| | | |
|---|---|---|
| 6,351,213 B1 | 2/2002 | Hirsch |
| 6,356,282 B2 | 3/2002 | Roytman et al. |
| 6,420,968 B1 | 7/2002 | Hirsch |
| 6,430,712 B2 | 8/2002 | Lewis |
| 6,473,407 B1 | 10/2002 | Ditmer et al. |
| 6,487,457 B1* | 11/2002 | Hull .................. G05B 15/02 700/17 |
| 6,492,901 B1 | 12/2002 | Ridolfo |
| 6,535,122 B1 | 3/2003 | Bristol |
| 6,549,135 B2 | 4/2003 | Singh et al. |
| 6,675,591 B2 | 1/2004 | Singh et al. |
| 6,681,156 B1 | 1/2004 | Weiss |
| 6,690,980 B2 | 2/2004 | Powell |
| 6,813,587 B2 | 11/2004 | McIntyre et al. |
| 6,816,811 B2 | 11/2004 | Seem |
| 6,870,141 B2 | 3/2005 | Damrath et al. |
| 6,879,253 B1 | 4/2005 | Thuillard |
| 6,892,546 B2 | 5/2005 | Singh et al. |
| 6,907,300 B2* | 6/2005 | O'Mahoney ......... G05B 19/042 345/173 |
| 6,919,809 B2 | 7/2005 | Blunn et al. |
| 6,947,972 B2 | 9/2005 | Chun |
| 6,955,302 B2 | 10/2005 | Erdman, Jr. |
| 6,973,627 B1 | 12/2005 | Appling |
| 6,990,821 B2 | 1/2006 | Singh et al. |
| 7,024,283 B2 | 4/2006 | Bicknell |
| 7,047,092 B2* | 5/2006 | Wimsatt .................. 715/771 |
| 7,062,389 B2 | 6/2006 | Johnson et al. |
| 7,068,931 B2 | 6/2006 | Tokunaga |
| 7,069,181 B2 | 6/2006 | Jerg et al. |
| 7,085,674 B2 | 8/2006 | Iwasawa |
| 7,113,085 B2 | 9/2006 | Havekost |
| 7,171,287 B2 | 1/2007 | Weiss |
| 7,243,044 B2 | 7/2007 | McCalla |
| 7,250,856 B2 | 7/2007 | Havekost et al. |
| 7,277,018 B2 | 10/2007 | Reyes et al. |
| 7,345,580 B2 | 3/2008 | Akamatsu et al. |
| 7,457,869 B2 | 11/2008 | Kernan |
| 7,460,020 B2 | 12/2008 | Reyes et al. |
| 7,596,613 B2 | 9/2009 | Silverthorne et al. |
| 7,653,459 B2 | 1/2010 | Pouchak et al. |
| 7,819,334 B2 | 10/2010 | Pouchak et al. |
| 7,826,929 B2 | 11/2010 | Wacker |
| 7,904,186 B2* | 3/2011 | Mairs et al. .................. 715/762 |
| 8,196,185 B2* | 6/2012 | Geadelmann et al. ........... 726/4 |
| 8,572,502 B2* | 10/2013 | Dharwada ............ G06F 3/0481 715/733 |
| 2003/0101009 A1 | 5/2003 | Seem |
| 2003/0171851 A1 | 9/2003 | Brickfield et al. |
| 2004/0143510 A1 | 7/2004 | Haeberle et al. |
| 2005/0038571 A1 | 2/2005 | Brickfield et al. |
| 2005/0043862 A1 | 2/2005 | Brickfield et al. |
| 2005/0193285 A1 | 9/2005 | Jeon |
| 2005/0203490 A1 | 9/2005 | Simonson |
| 2006/0136558 A1 | 6/2006 | Sheehan et al. |
| 2006/0168013 A1 | 7/2006 | Wilson et al. |
| 2006/0253205 A1 | 11/2006 | Gardiner |
| 2007/0180407 A1* | 8/2007 | Vahtola .................. 715/847 |
| 2007/0260999 A1* | 11/2007 | Amadio et al. ............... 715/804 |
| 2008/0010049 A1 | 1/2008 | Pouchak et al. |
| 2008/0016493 A1 | 1/2008 | Pouchak et al. |
| 2008/0115153 A1 | 5/2008 | Brindle |
| 2008/0125914 A1 | 5/2008 | Wacker |
| 2008/0229226 A1* | 9/2008 | Rowbottom ....... H05B 37/0245 715/771 |
| 2009/0062964 A1* | 3/2009 | Sullivan .................. G05B 15/02 700/276 |
| 2009/0100361 A1* | 4/2009 | Abello et al. .................. 715/764 |
| 2009/0113037 A1 | 4/2009 | Pouchak |
| 2009/0192849 A1* | 7/2009 | Hughes et al. .................... 705/7 |
| 2009/0213074 A1* | 8/2009 | Cheng .................... G06F 3/023 345/163 |
| 2010/0100583 A1 | 4/2010 | Pouchak |
| 2010/0106543 A1 | 4/2010 | Marti |
| 2010/0131877 A1 | 5/2010 | Dharwada et al. |
| 2010/0287130 A1 | 11/2010 | Guralnik et al. |
| 2011/0010654 A1 | 1/2011 | Raymond et al. |
| 2011/0113166 A1* | 5/2011 | Hung .................... G06F 13/426 710/63 |

FOREIGN PATENT DOCUMENTS

| | | |
|---|---|---|
| WO | WO 03/090038 | 10/2003 |
| WO | WO 2004/053772 | 6/2004 |
| WO | WO 2004/055608 | 7/2004 |
| WO | WO 2004/070999 | 8/2004 |
| WO | WO 2005/020167 | 3/2005 |
| WO | WO 2006/048397 | 5/2006 |
| WO | WO 2007/024622 | 3/2007 |
| WO | WO 2007/024623 | 3/2007 |
| WO | WO 2007/027685 | 3/2007 |
| WO | WO 2007/082204 | 7/2007 |

OTHER PUBLICATIONS

U.S. Appl. No. 12/703,476, filed Feb. 10, 2010.
U.S. Appl. No. 12/722,364, filed Mar. 11, 2010.
U.S. Appl. No. 12/792,547, filed Jun. 2, 2010.
U.S. Appl. No. 12/822,997, filed Jun. 24, 2010.
U.S. Appl. No. 12/977,701, filed Dec. 23, 2010.
Honeywell Spyder Bacnet User's Guide, 242 pages, Revised Jul. 2009.
Honeywell Spyder User's Guide 202 pages, Released Jul. 2007.
http://blogs.msdn.com/b/khen1234/archive/2005/05/11/416392.
aspx, "Regular Expressions in T-SQL," 4 pages, May 11, 2005.
http://en.wikipedia.org/wiki/JAR_(file_format), "JAR (file Format)—Wikipedia, the Free Encyclopedia," 3 pages, printed Dec. 26, 2009.
Siemens, BACnet for DESIGO 27 Pages, prior to Dec. 30, 2009.
Tridium, "NiagaraAX Product Model Overview," 7 pages, 2005.
Tridium, "Tridium & Niagara Framework Overview," 9 pages, prior to Oct. 28, 2008.
http://www.google.com/maps, "Google Maps, Pin Location," 1 page, prior to Nov. 21, 2008.
Microsoft Word Screen Shots, 2 pages, prior to Nov. 21, 2008.
Adobe Acrobat 6.0 Standard, Version 6.0.2, Screenshots, 2 pages, May 18, 2004.
Honeywell, "Excel Building Supervisor-Integrated R7044 and FS90 Ver. 2.0," Operator Manual, 70 pages, Apr. 1995.
Trane, "System Programming, Tracer Summit Version 14, BMTW-SVP01D-EN," 623 pages, 2002.

* cited by examiner

BUILDING CONTROL SYSTEM USER INTERFACE WITH PINNED DISPLAY FEATURE

TECHNICAL FIELD

This disclosure relates generally to building control systems, and more particularly to the user interface of a building control system.

BACKGROUND

Building control systems may provide a large amount of data pertaining to HVAC equipment, security alarms, refrigeration monitoring and/or the like. In some instances, building control systems may provide such information for a large number of sites that can be within different portions of a building or within different buildings. The buildings may even be geographically scattered. Individuals charged with operating these building control systems, such as alarm managers or building superintendents, for example, may have to monitor events at multiple sites and/or diagnose and/or fix a large number of potential problems in a short amount of time.

It will be appreciated that the amount of information presented to the individual may become overwhelming. There is a need for a building control system that provides the individual with organizational tools that help manage the relatively large amounts of building control data in an efficient and intuitive manner.

SUMMARY

This disclosure relates generally to building control systems, and more particularly to building control systems that include a user interface that is configured to help manage relatively large amounts of building control data in an efficient and intuitive manner.

In an illustrative but non-limiting example, a building control system may include a building control program that has access to building control information, and can display at least selected building control information on a display via a user interface. Sometimes through interaction with the user interface, a first set of building control information may be associated with a first display element on the display. The first display element may correspond to, for example, a window, a tab, an icon or any other suitable display element. Likewise, a second set of building control information may be associated with a second display element. The second display element may correspond to, for example, a window, a tab, an icon or any other suitable display element. In some cases, the first set of building control information may correspond to, for example, one or more building control parameters from a first geographic site or location, and the second set of building control information may correspond to one or more building control parameters from a second geographic site or location, but this is not required. The first set of building control information may be displayed when the first display element is selected for display, and the second set of building control information may be displayed when the second display element is selected for display. It is contemplated that additional sets of building control information may be associated with other corresponding display elements, as desired.

To help manage the building control information in an efficient and intuitive manner via the user interface, the first display element and/or the second display element may be pinned to in a corresponding pin display element that may be displayed on the display. In some cases, the pin display element may include, for example, a link to the corresponding display element such that when the pin display element is selected, the corresponding display element is again displayed on the display. In some cases, the pin display element may display a value of at least one building control parameter that is associated with the subset of building control information of the corresponding display element. When so provided, the value of the at least one building control parameter that is displayed in the pin display element may be automatically updated over time via updated received building control information. In some cases, the user can select which building control parameter value(s) is displayed in the pin display element.

The pin display element may provide a convenient way to "pin" the first display element and/or the second display element on the screen. The first (or other) display element may be pinned when, for example, the user does not wish to display the first (or other) display element, but wants to maintain easy access to the first (or other) display element such as when subsequent monitoring of the corresponding building control information is anticipated or desired. In some cases, and when the pin display element also displays a value of at least one building control parameter that is associated with the subset of building control information of the first (or other) display element, the user may still be able to monitor the value of at least some of the building control parameters without having to display the first (or other) display element on the display.

The above summary is not intended to describe each and every disclosed embodiment or every implementation of the disclosure. The Description that follows more particularly exemplify the various illustrative embodiments.

BRIEF DESCRIPTION OF THE FIGURES

The following description should be read with reference to the drawings. The drawings, which are not necessarily to scale, depict selected embodiments and are not intended to limit the scope of the disclosure. The disclosure may be more completely understood in consideration of the following detailed description of various embodiments in connection with the accompanying drawings, in which.

While the invention is amenable to various modifications and alternative forms, specifics thereof have been shown by way of example in the drawings and will be described in detail. It should be understood, however, that the intention is not to limit the invention to the particular illustrative embodiments described. On the contrary, the intention is to cover all modifications, equivalents, and alternatives falling within the spirit and scope of the invention.

DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Figure 1:
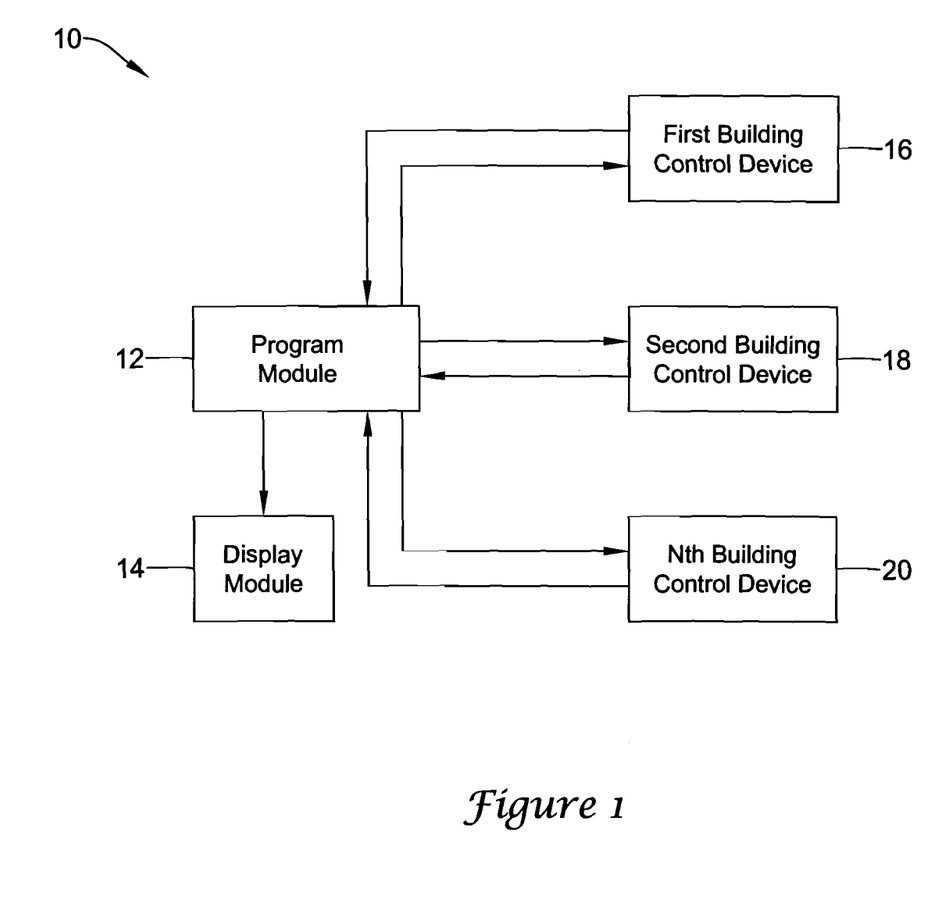
FIG. 1 is a schematic view of an illustrative but non-limiting building control system.

FIG. 1 is a schematic view of an illustrative but non-limiting building control system 10. The illustrative building control system 10 may include a program module 12 and a display module 14. In some instances, program module 12 represents software that is running on a computer such as a server, or perhaps a general purpose computer such as a desktop, laptop or workstation. Display module 14 may represent a display device such as an LCD display, a CRT monitor, or the like, that is connected to the computer facilitating program module 12. In some cases, display module 14 may be a distinct computer that is located remotely from the computer facilitating program module 12, but may also be disposed proximate the aforementioned computer. In some instances, display module 14 may represent a remote computer display, via a thin client (such as Microsoft Internet Explorer™ or equivalent) that can display information provided over a network from program module 12.

Building control system 10 may include a few or even up to thousands of building control devices. For illustrative purposes, building control system 10 is shown here with a first building control device 16, a second building control device 18 and an $N^{th}$ building control device 20, where N is an integer higher than two, and may be as high as several or even many thousands. Each building control device 16, 18, 20 can be seen as being in communication with program module 12. Communication with each building control device 16, 18, 20 may be accomplished in any suitable manner. In some cases, at least some of the building control devices 16, 18, 20 may be in communication with program module 12 over a network such as a telephone network, a local area network (LAN), a wide area network (WAN) or even the Internet. In some instances, it is contemplated that at least some of the building control devices 16, 18, 20 may be in wireless communication with program module 12. The building control devices may be the same or different, and in some cases, may represent a wide variety of different devices. Illustrative but non-limiting examples include thermostats, other HVAC controllers, security alarm controllers, motion sensors, temperature sensors, pressure sensors, high temperature limit sensors and/or any other suitable device.

Building control system 10 may be configured to assist a user in viewing and/or organizing a potentially substantial amount of building control information that may be obtained from one or more of building control devices 16, 18 and 20. For example, program module 12 may create or otherwise provide graphical and/or alphanumerical display elements that may be associated with particular building control information. The display elements may be display windows, tabs, icons and the like. In some instances, program module 12 may permit the user to "pin" a display element and its associated building control information when, for example, the user does not wish to display the associate building control information, but still wants to maintain easy access to the associated building control information such as when subsequent monitoring of the information is anticipated or desired. If and/or when the user wants once again display the associated building control information, they may do so by simply selecting a corresponding pinned display element.

In one example, program module 12 may associate a first set of building control information (e.g. certain building control information from a first site) with a first display element and may associate a second set of building control information (e.g. certain building control information from a second site) with a second display element. In some cases, additional display elements may be associated with additional sets of building control information. If the first display element has been selected, such as by clicking on the first display element, the first set of building control information may be displayed via display module 14. If the second display element is selected, the second set of building control information may be displayed via display module 14.

It will be appreciated that reference to a first display element and a second display element is merely illustrative, as there may be tens, hundreds or even thousands of potential display elements assigned to a similar number of distinct sets of building control information. Moreover, a first display element may be considered as referring to a particular display element (assigned to a particular set of building control information) while a second display element may be considered as referring to a subsequent particular display element (assigned to a subsequent particular set of building control information).

Figure 2:
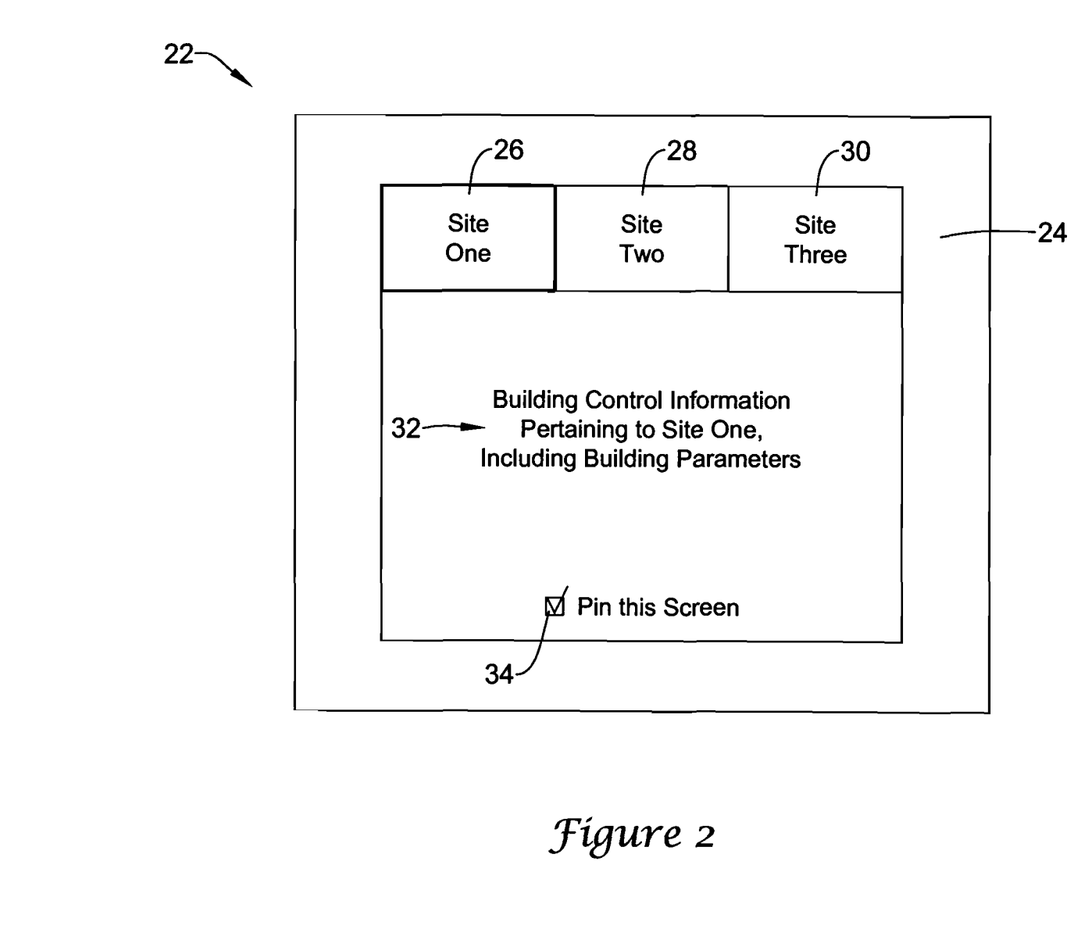
FIGS. 2 through 4 are diagrammatic views of illustrative displays that may be generated by the building control system of FIG. 1.
Figure 3:
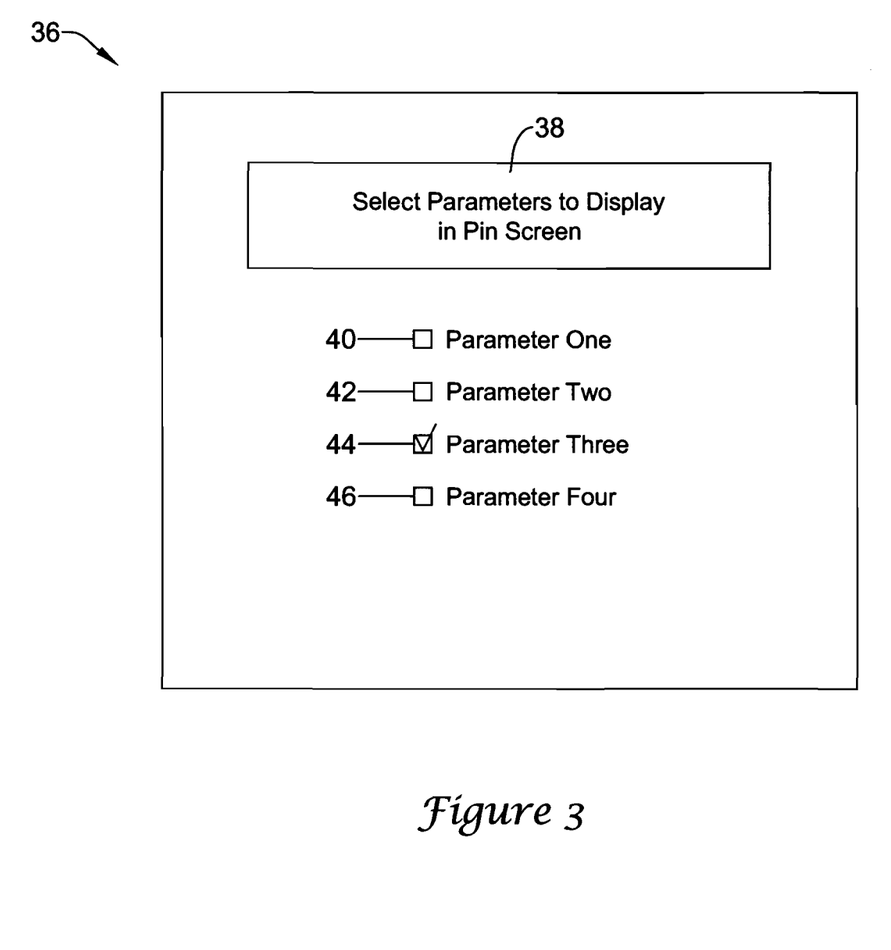
Figure 4:
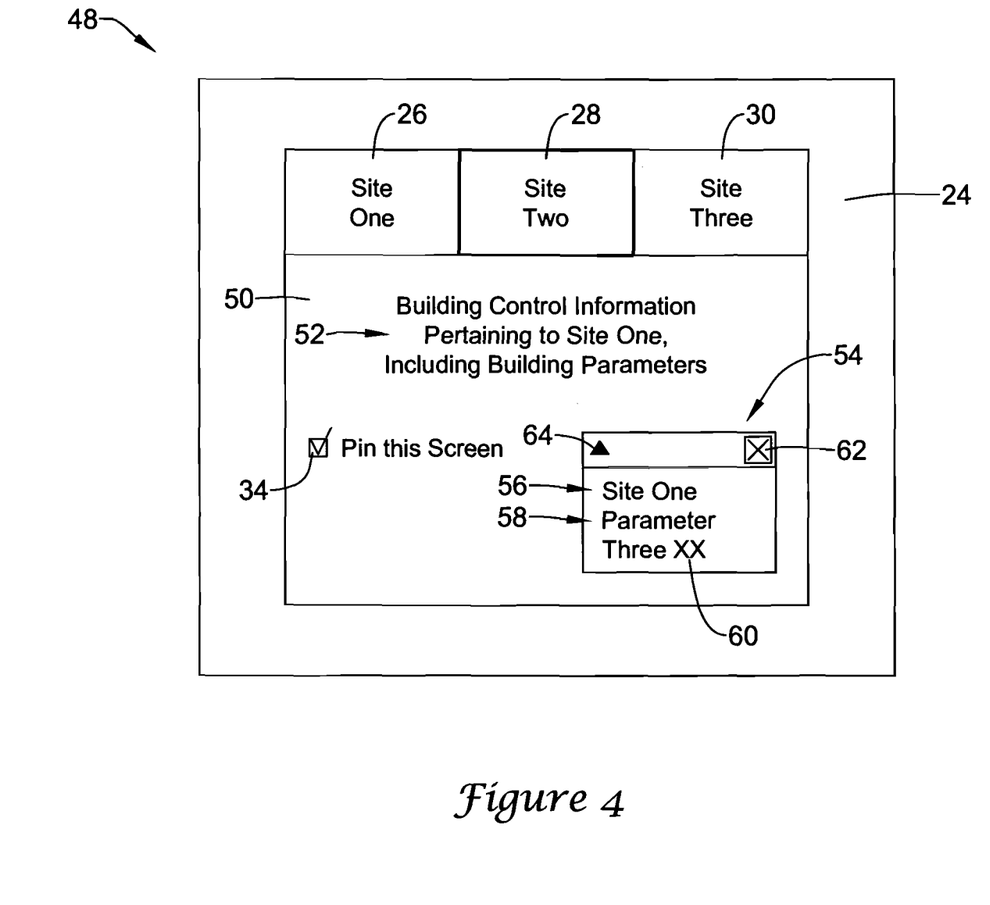

In some instances, a user may view tens, hundreds or even thousands of individual display elements pertaining to distinct sets or subsets of building control information. A user may, for example, wish to track one or more building control parameters at a particular site even while viewing other building control information, perhaps from other sites. For example, a particular subset of building control information may include a temperature sensor value at a particular site that is outside or nearly outside an expected temperature range. A user may wish to monitor the aberrant temperature value while still traversing through other display elements of building control information of the same or another site. FIGS. 2 through 4 provide a diagrammatic view of illustrative displays that may be displayed via display module 14 (FIG. 1) and that are configured to help the user track and/or monitor certain building control information.

FIG. 2 shows an illustrative display 22 that may be displayed by display module 14 (FIG. 1). The illustrative display 22 includes a display window 24 and several tabs arrayed along the top of display window 24. It will be appreciated that this is merely illustrative, as the tabs, when provided, could be displayed along the bottom, side surface or any other part of the display window 24. As illustrated, there is a SITE ONE tab 26, a SITE TWO tab 28 and a SITE THREE tab 30, while in other instances there may be fewer or perhaps more tabs displayed. It is to be understood that reference to one, two and so on is not intended to be strictly interpreted as building site numbers, or building control device numbers, but rather as generally referring to adjacent, sequentially or otherwise organized and/or referenced building control data. It will be appreciated that each of the tabs may be assigned to a particular building control device such as building control device 16, 18 or 20 (FIG. 1), groups of building control devices such those located at particular building sites, and/or any other building control data. More generally, tabs 26, 28 and 30 are non-limiting examples of the aforementioned first and second display elements.

SITE ONE tab 26 can be seen to be highlighted, indicating that it has been selected via the user interface. As a result, and in the illustrative embodiment, display window 24 includes text, icons, graphs, and/or any other suitable building control information 32 that is related, assigned or otherwise associated with the SITE ONE tab 26. It will be appreciated that one may select another tab simply by clicking on or otherwise selecting the desired tab, which will cause program module 12 to display via display module 14 the appropriate information within display window 24. In the illustrative embodiment, display window 24 includes a PIN THIS SCREEN check box 34. A user may click this box to pin the display element 26 to a pin display element, which in some cases, may be a reduced-size version of display window 24 as shown and described with reference to FIG. 4.

In some cases, clicking on PIN THIS SCREEN check box 34 of FIG. 2 may cause building control system 10 (FIG. 1) to display a screen 36, as seen in FIG. 3. While shown as a separate display, it will be appreciated that display 36 may represent a pop-up box that may float on display window 24 (FIG. 2). In some cases, display 36 may be embedded in the previously displayed display, or may replace the previously displayed display.

Display 36 may include a text box 38 that instructs the user to select one or more parameters to display within the pin display element. Depending on the specific nature of the building control information, these parameters may be temperature values, alarm status, equipment performance, and the like, and may be context specific. Illustrative display 36 also includes check boxes that permit the user to select one or more parameters to display in the pin display element. As illustrated, display 36 includes a Parameter One check box 40, a Parameter Two check box 42, a Parameter Three check box 44 and a Parameter Four check box 46. In this particular example, the user has selected Parameter Three to be displayed, as they have clicked on Parameter Three check box 44.

FIG. 4 provides an illustrative display 48 that may be displayed by display module 14 (FIG. 1) after the PIN THIS SCREEN check box 34 of FIG. 2 has been selected. The illustrative display 48 includes a display window 50 that includes, as previously discussed, SITE ONE tab 26, SITE TWO tab 28 and SITE THREE tab 30. In this instance, it can be seen that SITE TWO tab 28 has now been selected. As a result, building control system 10 (FIG. 1) provides via display module 14 (FIG. 1) building control information 52 that pertains to building control information that is associated with SITE TWO tab 28. Also, building control system 10 (FIG. 1) also is displaying a pin display element 54 that has resulted from the user selections previously discussed with respect to FIGS. 2 and 3.

The illustrative pin display element 54 includes a graphical and/or alphanumeric indication 56 that identifies the building control information represented by pin display element 54. Pin display element 54 may also include a graphical and/or alphanumeric indication 58 that identifies the parameter(s) being shown as well as a current parameter value 60. In some instances, parameter value 60 may represent real-time data, as parameter value 60 may be continually updated by the building control system 10. In some cases, parameter value 60 may be updated once per second, once per minute, or any other desired interval, depending perhaps on the criticality of the parameter being displayed, bandwidth considerations between the particular building control device and the building control system 10, the anticipated rate of change of the particular parameter, and/or other considerations as desired. While a single parameter value 60 is shown in FIG. 4, it will be appreciated that pin display element 54 may display the values of several different parameters. Also, while parameter value 60 is generically shown as a two digit value, it is contemplated that the parameter value(s) may be displayed in any suitable form including numerically, graphically, textually (e.g. on, off, high, low, etc.), or in any other suitable form. Pin display element 54 may be considered as displaying at least some of the information or data that was previously displayed in the display from which pin display element 54 was created. For example, pin display element 54 may include information or data that was displayed on display 22 (FIG. 2).

In the illustrative embodiment, pin display element 54 includes a button 64 that, if clicked or otherwise selected, may cause building control system 10 (FIG. 1) to reopen or otherwise display window 24 (FIG. 2). In some cases, pin display element 54 may also include a termination button 62 that, if clicked or otherwise selected, may close pin display element 54 and/or close display window 24. While a single pin display element 54 is illustrated in FIG. 4, it will be appreciated that in some cases a user may open or create a number of different pin display elements, with each pin display element tied or otherwise associated with a particular set or subset of building control information and/or a particular building control device, as desired. In some cases, each pin display element may float atop whichever display is being displayed. Also, and in some instances, a user may be able to arrange the pin display elements on the display by dragging the individual pin display elements to desired locations on the display. In some cases, the various pin display elements may be docked in a docking element, similar to the docking elements described in co-pending application filed on the even date herewith, titled "BUILDING CONTROL SYSTEM USER INTERFACE WITH DOCKING FEATURE", which application is incorporated herein by reference.

In some cases, building control system 10 (FIG. 1) may include provisions that permit a user to pin, either simultaneously or sequentially, each of the displays presently displayed by display module 14 (FIG. 1). In some instances, building control system 10 may include provisions that permit a user to close or otherwise delete and or all of the currently displayed pin display elements. The number of pin display elements that may be displayed at the same time may be a function of available space on whatever computer monitor or other display is being used to display the pin display elements. In some cases, the number of permitted displayed pin display elements may be a user-settable parameter or may even be built into building control system 10.

Figure 5:
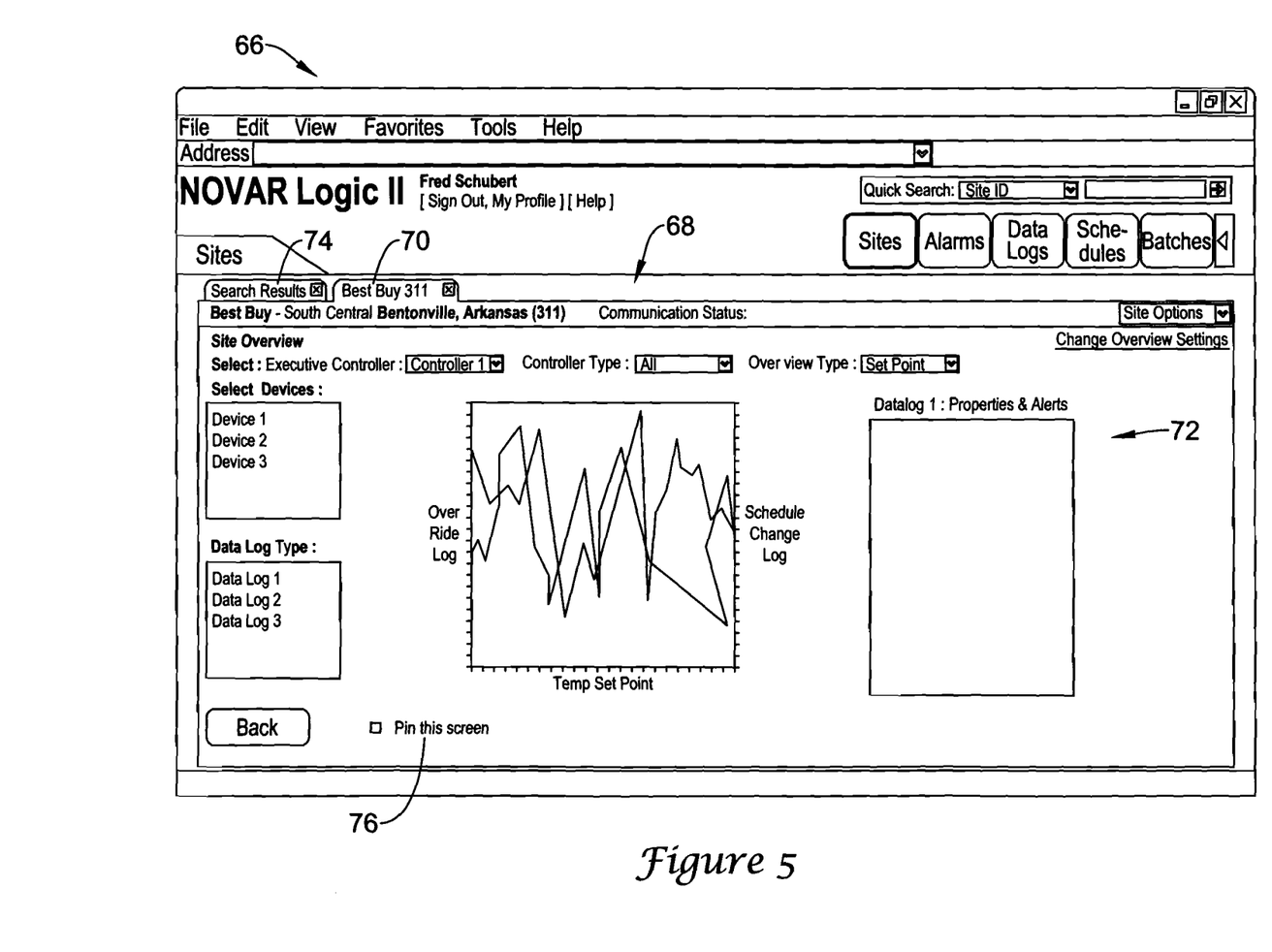
FIGS. 5 through 7 are screen captures of illustrative displays that may be generated via the building control system of FIG. 1.
Figure 6:
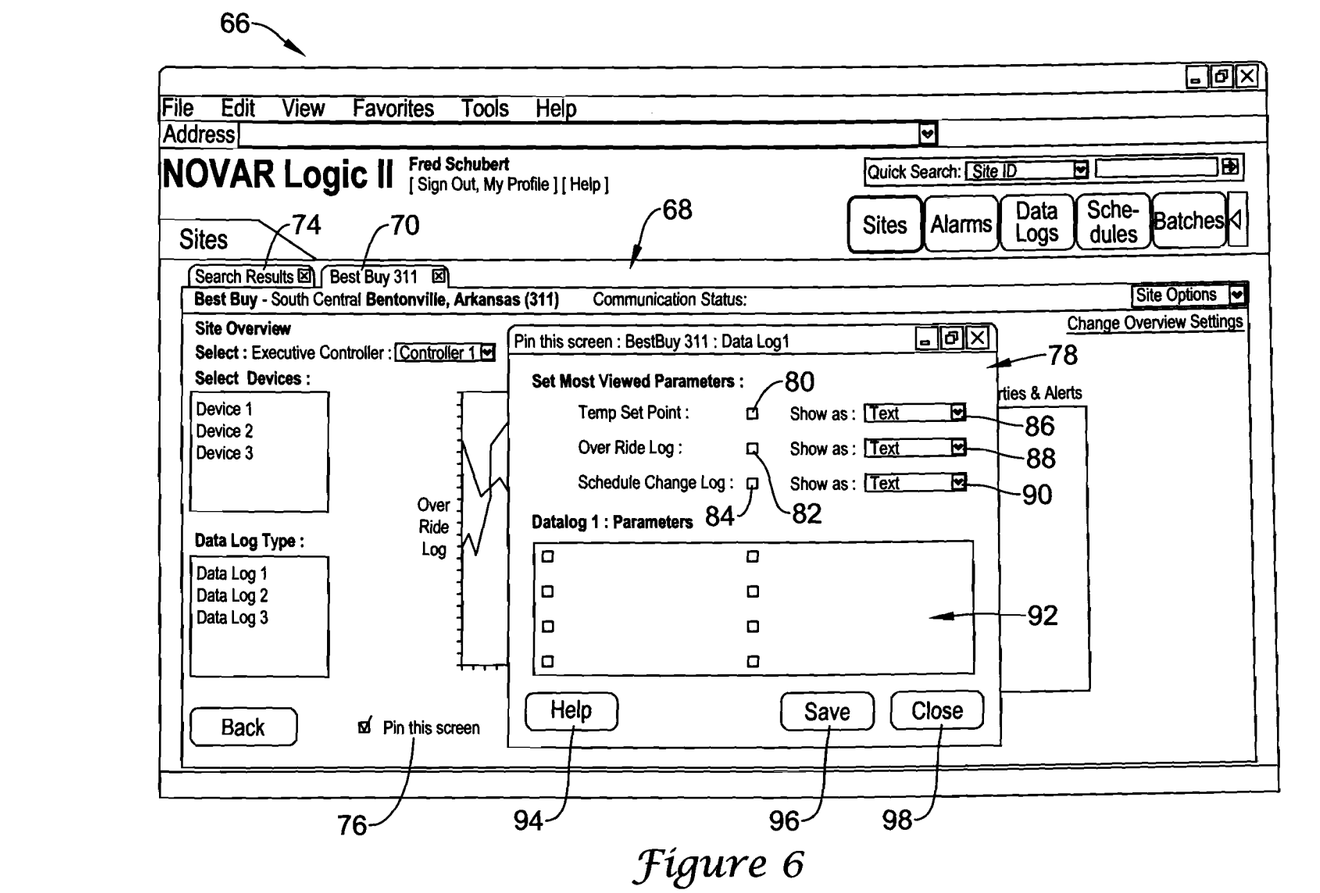
Figure 7:
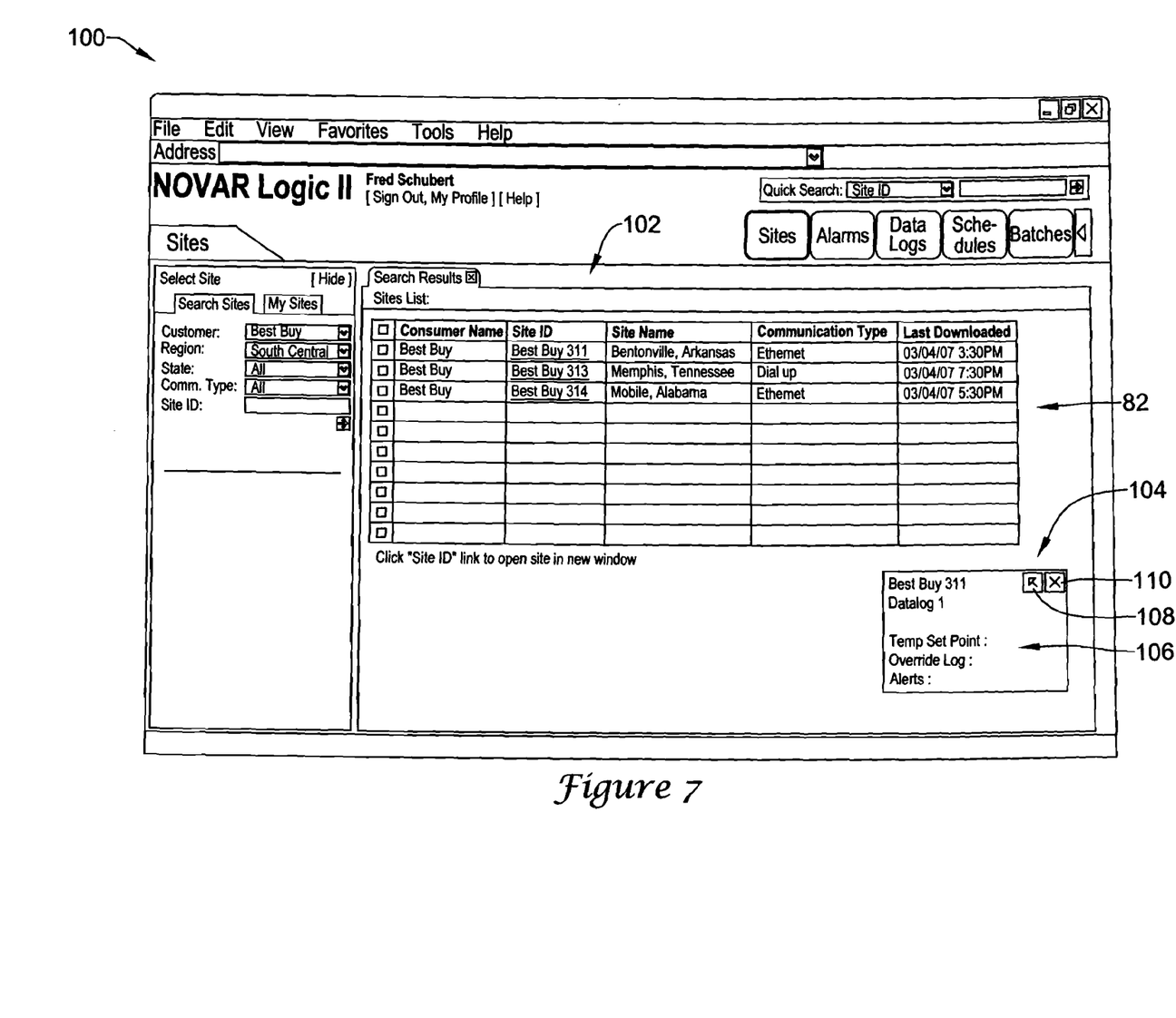

FIGS. 5 through 7 are illustrative but non-limiting screen captures showing displays that may be generated via building control system 10 (FIG. 1). FIG. 5 shows a display 66 that includes a tabbed display 68. Tabbed display 68 may, as illustrated, include an identifying tab 70 as well as an information display region 72. It can be seen that illustrative display 66 also includes a non-selected identifying tab 74. Information display region 72 may provide information pertaining to the building site or building control device or parameters represented by identifying tab 70. Display 66 also includes a PIN THIS SCREEN check box 76. While a check box 76 is shown, it is contemplated that any mechanism may be used to activate the pin feature. In the illustrative embodiment, clicking on PIN THIS SCREEN check box 76 may cause building control system 10 (FIG. 1) to display a display 78, as seen in FIG. 6.

While display 78 is illustrated as floating over display 66, it will be appreciated that in some cases, display 78 may be displayed instead of display window 68. In the illustrative embodiment, display 78 provides the user with an opportunity to select which parameter or parameters will be displayed in the resulting pin display element. As illustrated, the user may select between a Temp Set Point check box 80, an Over Ride Log check box 82 and a Schedule Change Log check box 84. In some instances, the user may be able to adjust how each of the selected parameters is/are displayed, using pull-down menus 86, 88 and 90, respectively. A selection box 92 may in some cases provide additional options, choices and the like.

In some cases, display 78 may include one or more of a HELP button 94, a SAVE button 96 and a CLOSE button 98. Clicking or otherwise selecting HELP button 94 may gain context-specific information to help guide the user. Pressing CLOSE button 98 may essentially cancel the pin feature while pressing SAVE button 96 may cause building control system 10 (FIG. 1) to save the information entered by the user and create the pin display element.

FIG. 7 shows an illustrative pin display element that may result from a user, with reference to FIG. 5, clicking or otherwise selecting SAVE button 96. In particular, FIG. 7 shows an illustrative display 100 that includes a display window 102. An illustrative pin display element 104 can be seen as floating on display window 102, but as described above, the pin display element 104 may be displayed in any suitable manner. Pin display element 104 shows several parameters 106, as previously selected with respect to FIG. 6. Also, illustrative pin display element 104 includes a button 108 that, if clicked or is otherwise selected, may cause building control system 10 (FIG. 1) to restore display window 68 as shown in FIG. 5. Pin display element 104 may also include a button 110 that, if clicked or is otherwise selected, may cause building control system 10 to remove pin display element 104.

FIGS. 8 through 12 are flow diagrams showing illustrative methods that may be carried out using building control system 10 (FIG. 1). In some cases, building control system 10 or at least some aspects thereof may be manifested on a computer such as a server or a general purpose computer such as a desktop or a laptop. In some instances, display module 14 (FIG. 1) may be manifested via a thin client on a general purpose computer.

Figure 8:
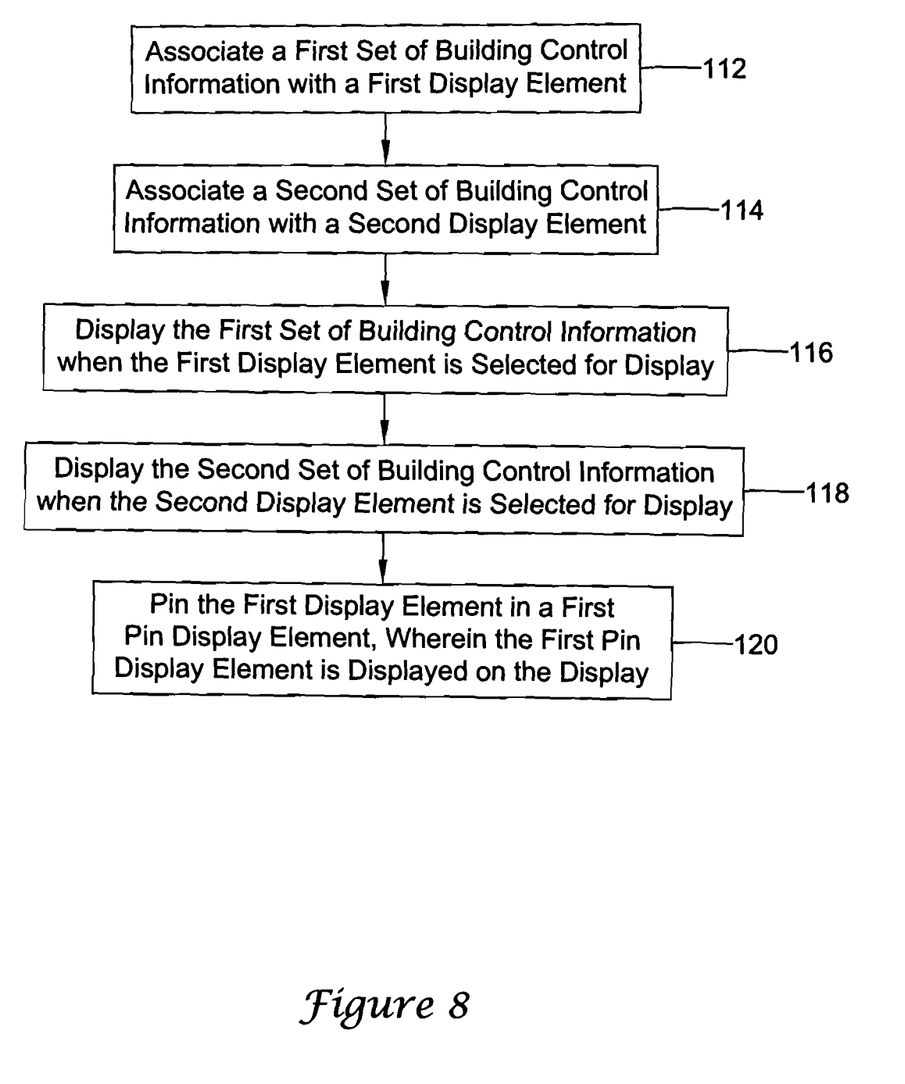
FIGS. 8 through 12 are flow diagrams showing illustrative methods that may be carried out using the building control system of FIG. 1.

In FIG. 8, control begins at block 112, where a first set of building control information is associated with a first display element. The first set of building control information may, for example, pertain to information provided by a particular building control device or particular building control site, but this is not required. At block 114, a second set of building control information is associated with a second display element. The second set of building control information may, for example, pertain to information provided by a particular building control device or particular building control site, but this is not required. The first and second display elements may, for example, be a window, tab, icon or any other suitable display element that can be displayed on a display via display module 14 (FIG. 1), and may include a graphical and/or alphanumeric identification of the building control information that is represented by the particular display element. It will be appreciated that one or more of the blocks described herein may be processed in any order, or even simultaneously.

Control passes to block 116, where building control system 10 (FIG. 1) displays the first set of building control information when the first display element has been selected for display. If the second display element has been selected for display, building control system 10 may display the second set of building control information, as seen at block 118. In some instances, as shown at block 120, the first display element may be pinned in a first pin display element in which the first pin display element is displayed via display module 14 (FIG. 1).

Figure 9:
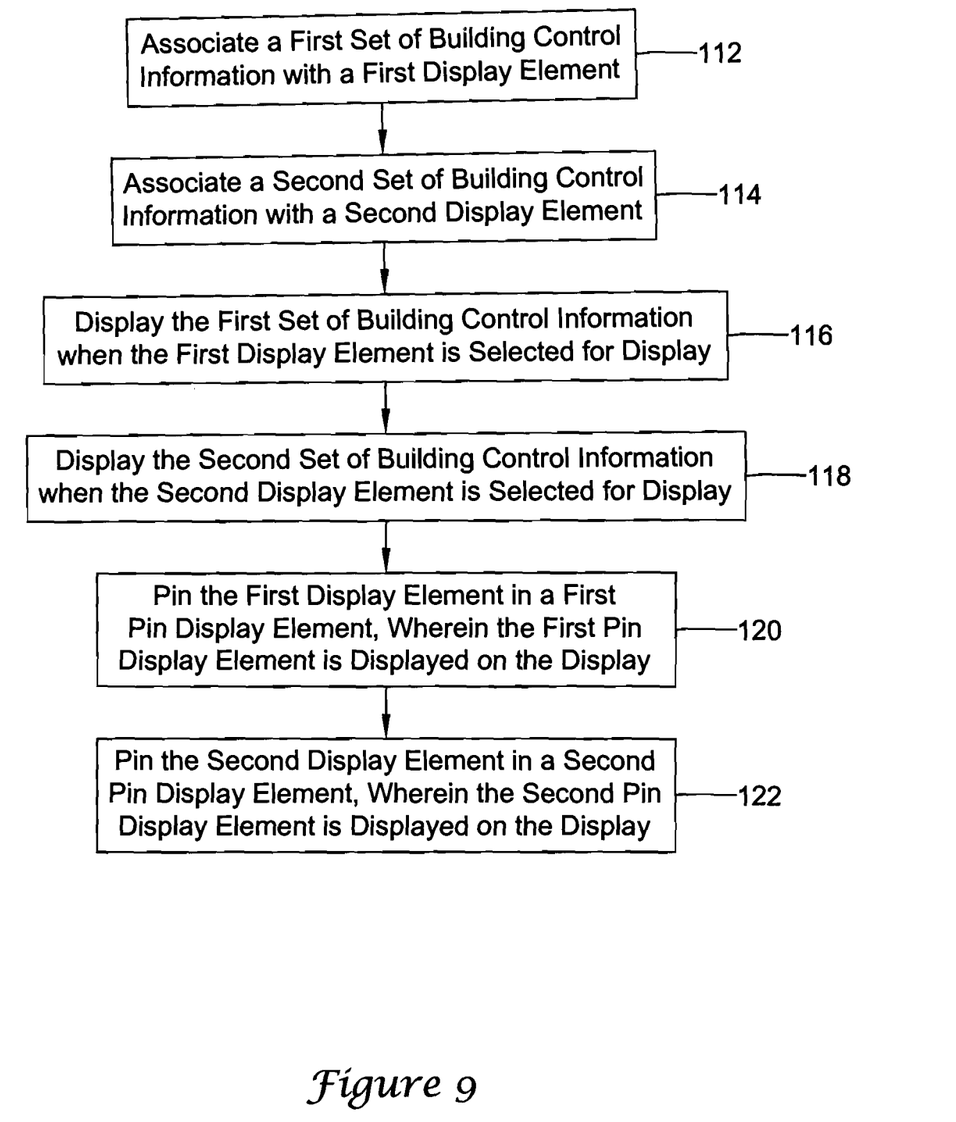

In FIG. 9, control begins at block 112, where a first set of building control information is associated with a first display element. At block 114, a second set of building control information is associated with a second display element. In some cases, each set of building control information pertains to a particular building control device, a particular set of building control devices, a particular building site, one or more building control parameters or alarms, or any other set or group of building control information. Control passes to block 116, where building control system 10 (FIG. 1) displays the first set of building control information when the first display element has been selected for display and displays the second set of building control information, as seen at block 118, if the second display element has been selected for display. In some instances, as shown at block 120, the first display element may be pinned in a first pin display element such that the first pin display element is displayed via display module 14 (FIG. 1). Also, and as shown at block 122, the second display element may be pinned in a second pin display element such that the second pin display element is displayed via display module 14. In some instances, each pin display element may provide an indication of which of the first display element or the second display element the pinned display element corresponds. When a pinned display element is selected, the corresponding first or second display element may again be displayed on the display.

Figure 10:
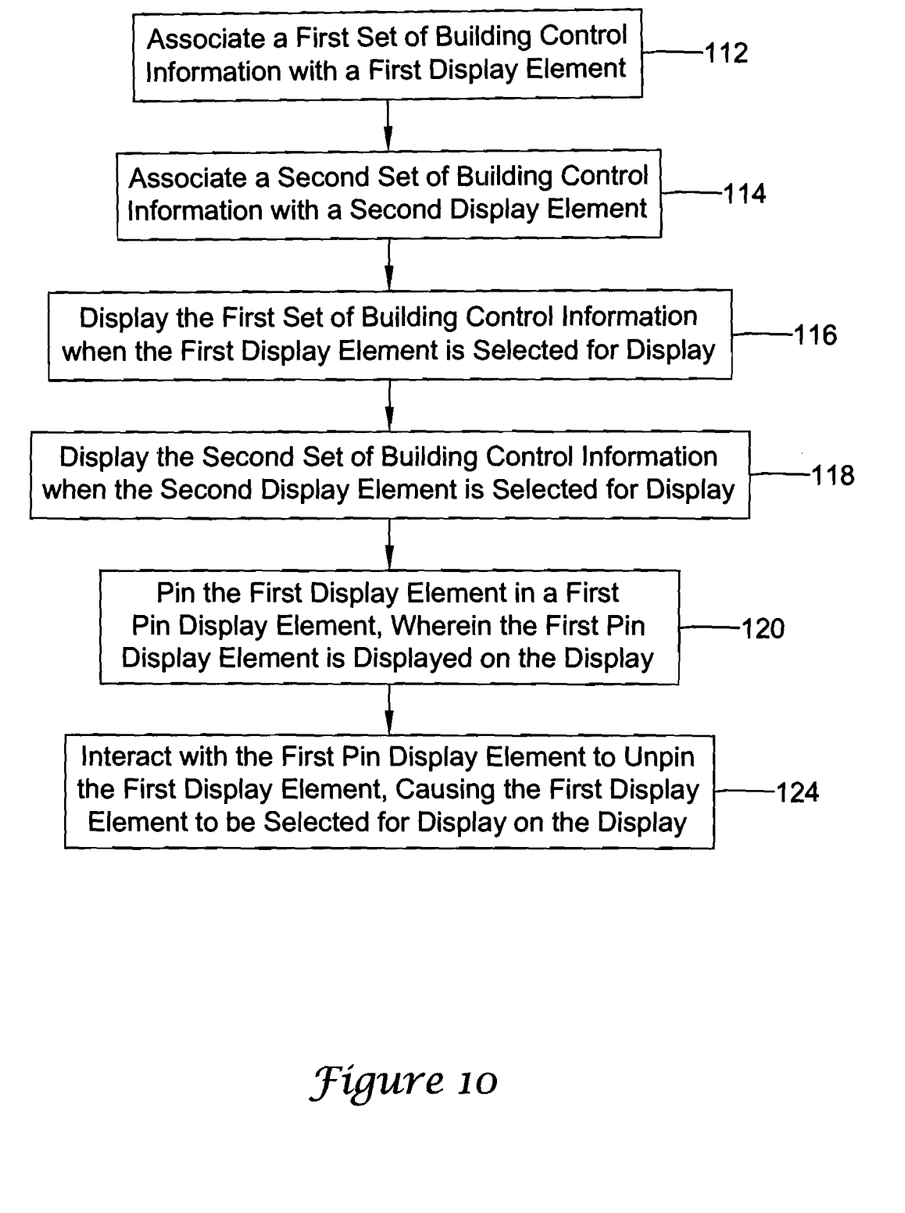

In FIG. 10, control begins at block 112, where a first set of building control information is associated with a first display element. At block 114, a second set of building control information is associated with a second display element. In some cases, each set of building control information pertains to a particular building control device, a particular set of building control devices, a particular building site, one or more building control parameters or alarms, or any other set or group of building control information. Control passes to block 116, where building control system 10 (FIG. 1) displays the first set of building control information when the first display element has been selected for display and displays the second set of building control information, as seen at block 118, when the second display element has been selected for display.

In some instances, as shown at block 120, the first display element may be pinned in a first pin display element such that the first pin display element is displayed via display module 14 (FIG. 1). As seen at block 124, in some instances a user may interact with the first pin display element to unpin the first display element, causing the first display element to be displayed on the display via display module 14.

Figure 11:
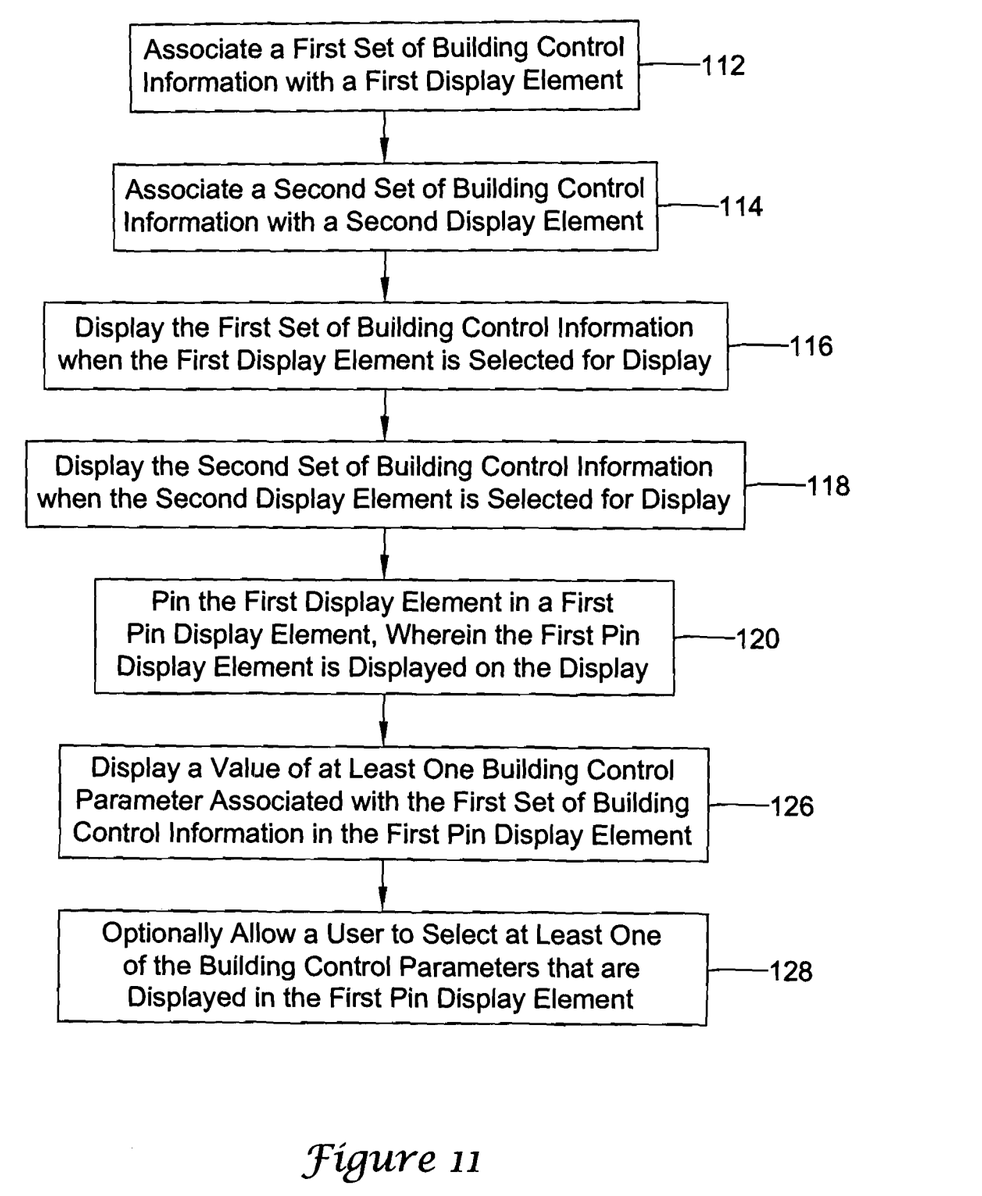

In FIG. 11, control begins at block 112, where a first set of building control information is associated with a first display element. At block 114, a second set of building control information is associated with a second display element. In some cases, each set of building control information pertains to a particular building control device, a particular set of building control devices, a particular building site, one or more building control parameters or alarms, or any other set or group of building control information. Control passes to block 116, where building control system 10 (FIG. 1) displays the first set of building control information when the first display element has been selected for display and displays the second set of building control information, as seen at block 118, when the second display element has been selected for display. In some instances, as shown at block 120, the first display element may be pinned in a first pin display element such that the first pin display element is displayed via display module 14 (FIG. 1).

Control passes to block 126, where building control system 10 (FIG. 1) displays a value of at least one building control parameter in the first pin display element. In some cases, the building control parameter that is displayed may be associated with the first set of building control information to which the first display element is assigned. In some instances, as seen at block 128, the user may be permitted to select the building control parameter or parameters that will be displayed in the first pin display element, although this is not required. In some instances, the displayed building parameter may be updated over time via updated received building control information from the building control system.

Figure 12:
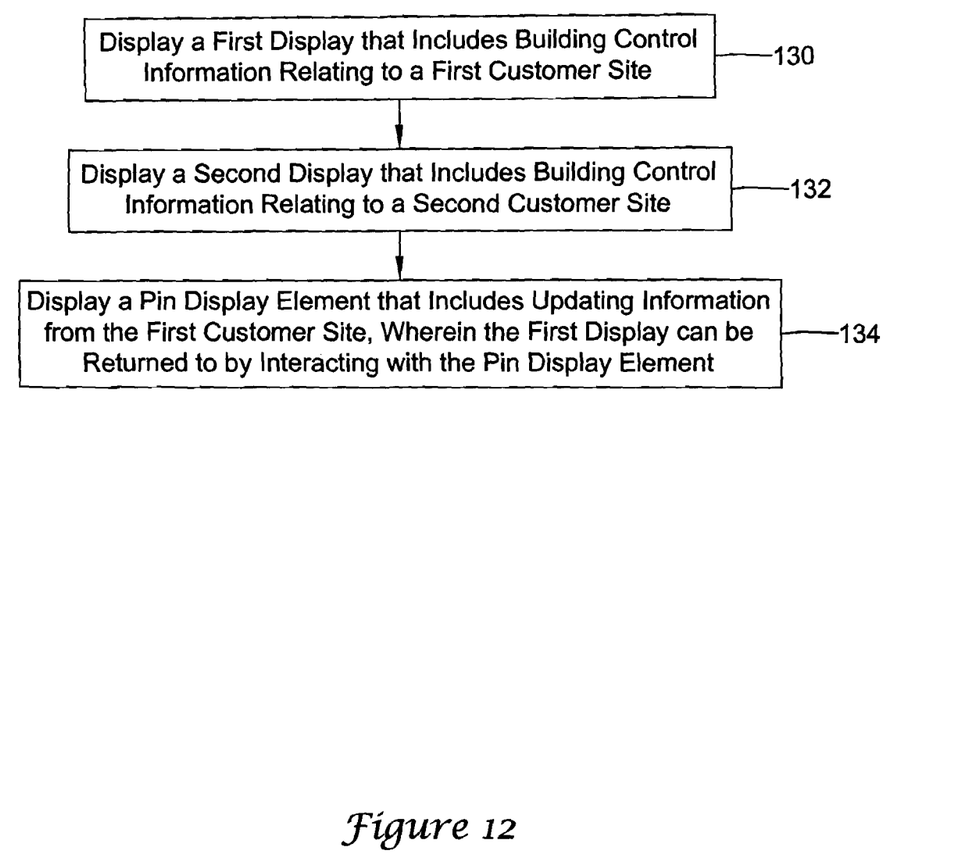

In FIG. 12, control begins at block 130, where a first display is displayed that includes building control information relating to a first customer site. A second display is displayed that includes building control information relating to a second customer site, as seen at block 132. Control passes to block 134, where a pin display element is displayed that includes updating information from the first customer site. The first display may be regained by interacting with the pin display element.

In some instances, the first customer site and the second customer site may be within a single building. In other cases, the first customer site and the second customer site may be in different buildings. The building control information may, for example, include one or more of HVAC information or security alarm information. The updating information that is displayed on the pin display element may, in some cases, be user-selectable. In some cases, the pin display element may be smaller than the first display and may display less information than the first display. In some instances, the pin display element may float over at least one of the first display and the second display, but this is not required.

The disclosure should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

What is claimed is:

1. A method of displaying building control information on a screen under the control of a building control program, wherein the building control program receives building control information from one or more remotely located building control devices that are under the control of the building control program, the method comprising:
    receiving and associating a first set of building control information from one of the remotely located building control devices that are under the control of the building control program with a first display element;
    receiving and associating a second set of building control information from another one of the remotely located building control devices that are under the control of the building control program with a second display element;
    displaying on the screen a display providing an option to select one of the first display element and the second display element;
    wherein, when the first display element is selected, the first set of building control information is displayed on the screen and the second set of building control information is not displayed on the screen, and when the second display element is selected, the second set of building control information is displayed on the screen and the first set of building control information is not displayed on the screen;
    pinning the first display element in a first pin display element on the screen to provide easy access to the first display element and thus the first set of building control information, wherein the pin display element displays at least some of the building control information from the first set of building control information previously displayed by the first display element, wherein the first and second display elements and the first pin display element are all displayed simultaneously on the screen; and
    wherein, while displaying the second display element, interacting with the first pin display element displayed on the screen to unpin the first display element to cause the first display element and the corresponding first set of building control information to be displayed on the screen.

2. The method of claim 1, further comprising:
    pinning the second display element in a second pin display element on the screen to provide easy access to the second display element and thus the second set of building control information.

3. The method of claim 1, wherein the building control information includes a number of building control parameters each having a value, the method further comprising:
    displaying a value of at least one of the building control parameters associated with the first set of building control information in the first pin display element.

4. The method of claim 3 further comprising:
    allowing a user to select the at least one of the building control parameters that are displayed in the first pin display element.

5. The method of claim 3 wherein the value of the at least one of the building control parameters that is displayed in the first pin display element is updated over time via updated received building control information from the one or more remotely located building control devices, and the updated value of the at least one of the building control parameters is displayed in the first pin display element.

6. The method of claim 5, wherein the updated value of the at least one of the building control parameters is displayed in the first pin display element automatically.

7. The method of claim 1 further comprising dragging the first pin display element to a desired location on the screen.

8. The method of claim 1 further comprising:
    executing the building control program on a general purpose computer.

9. The method of claim 8 further comprising:
    establishing communication between the general purpose computer and one or more remotely located building control devices.

10. The method of claim 8 wherein the general purpose computer is a server.

11. The method of claim 10, wherein the building control program displays building control information on the screen via a thin client executing on a personal computer, laptop or workstation.

12. The method of claim 8 wherein the general purpose computer is a personal computer, laptop or workstation.

13. A method of displaying building control information for a number of different customer sites, comprising:
    receiving building control information relating to a Heating, Ventilation, and Air Conditioning (HVAC) system of a first customer site at a program module operating a building control program;

receiving building control information relating to a Heating, Ventilation, and Air Conditioning (HVAC) system of a second customer site at the program module;

displaying a first window on a display of the program module configured to allow a selection of one of a first tab and a second tab;

displaying building control information relating to a Heating, Ventilation, and Air Conditioning (HVAC) system of the first customer site in the first window when the first tab is selected;

displaying building control information relating to a HVAC system of the second customer site in the first window when the second tab is selected;

receiving a selection from a user to display and displaying a pin display element, where the pin display element is displayed in a second window and displays at least one building control parameter value from the building control information relating to the HVAC system of the first customer site, and wherein the pin display element provides a shortcut to display the first tab in the first window including building control information relating to the HVAC system of the first customer site;

displaying the pin display element in the second window while displaying the second tab in the first window; and wherein upon selecting the pin display element, displaying the first tab including the building control information relating to the HVAC system of the first customer site.

14. The method of claim 13, wherein the first customer site and the second customer site are within a single building.

15. The method of claim 13, wherein the first customer site and the second customer site are within different buildings.

16. The method of claim 13, wherein the building control information includes HVAC control information.

17. The method of claim 13, wherein the building control information includes alarm information.

18. The method of claim 13, wherein the at least one parameter value that is displayed by the pin display element is updated from the first customer site.

19. The method of claim 13, wherein the second window of the pin display element is smaller than the first window.

20. The method of claim 13, wherein the second window of the pin display element floats over the first window.

* * * * *